Nov. 18, 1958  N. H. SUDECK  2,860,900

COUPLER OPERATING MECHANISM

Filed May 20, 1953  2 Sheets-Sheet 1

INVENTOR.
Norman H. Sudeck
BY
Owen O. P. Garner
Atty.

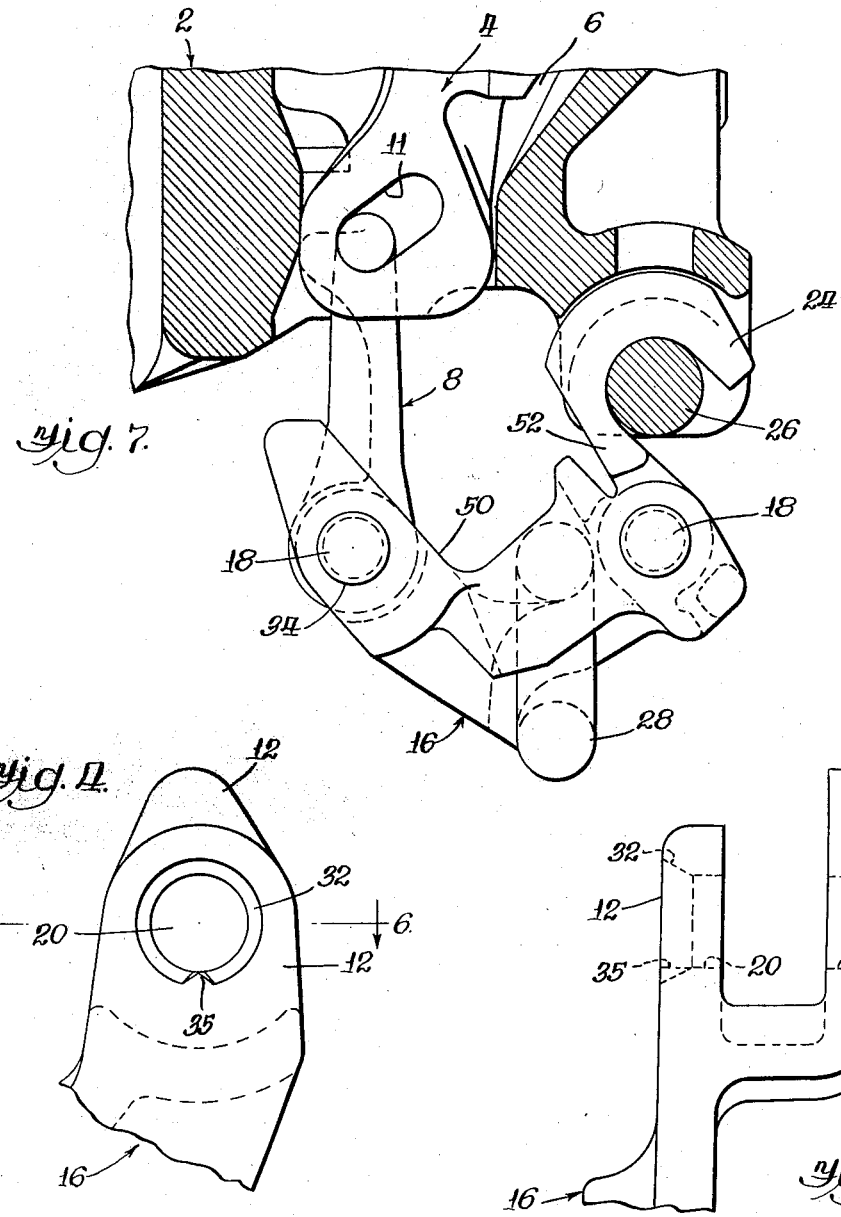

United States Patent Office 2,860,900
Patented Nov. 18, 1958

2,860,900

COUPLER OPERATING MECHANISM

Norman H. Sudeck, Alliance, Ohio, assignor to American Steel Foundries, Chicago, Ill., a corporation of New Jersey Application May 20, 1953, Serial No. 356,223

1 Claim. (Cl. 287—100)

This invention relates to automatic railway car couplers and more particularly to the connection between the rotor lever and lock of a bottom operated coupler such as the A. A. R. Standard E and H and alternate Standard F couplers.

According to prior art practices the rotor lever, whether a one-piece structure such as that disclosed by Metzger Patent No. 2,083,422, or a multipiece structure such as that shown by Kayler Patent No. 2,393,912, has been connected to the lock actuating toggle or link by a trunnion and slot connection or by a riveted connection which has been found to have certain advantages over a trunnion and slot connection.

Riveted connections have, however, been subject to one principal fault, namely failure of the rivet, due to wear in service; and this fault has generally been believed by those skilled in the art to be the necessary consequence of a riveted connection between the rotor lever and the toggle.

According to the present invention, however, it has been discovered that the primary cause of such rivet failures has not been due to wear during actuation and release of the parts, as is required in operation of the coupler, but has been caused by rotation of the rivet due to vibration in service when the operating parts are static.

It has further been discovered that this excessive rivet wear may be prevented by the provision of a tongue or lug in the rivet hole through the jaw of the rotor member, which tongue creates a complementary recess or groove in the rivet as it is headed in the usual manner. The tongue and groove cooperate in service to prevent rotation of the rivet relative to the rotor, thereby limiting wear on the rivet to that which is necessary during operation of the parts.

Accordingly, a primary object of the present invention is to devise an arrangement in which such rivet failures are prevented by providing means for preventing accidental rotation of the rivet.

A more specific object of the invention is to provide an automatic interlock between the rivet and rotor hole as the rivet is headed.

In one embodiment of the invention only one rivet is utilized, that is, in the connection between a one-piece rotor lever and the toggle; and in another embodiment of the invention two rivets are utilized, one in the connection between the forward and rear segments of the rotor lever, and another in the connection between the toggle and forward segment of the rotor lever.

The foregoing and other objects and advantages of the invention will become apparent from a consideration of the following specification and the accompanying drawings, wherein:

Figure 4 is a fragmentary side elevational view of the rotor lever shown in the preceding figures with the toggle and rivet removed;

Figure 5 is a fragmentary front elevational view of the structure shown in Figure 4;

Figure 6 is a sectional view on the line 6—6 of Figure 4, and

Figure 7 is a side elevational view similar to Figure 1, but illustrating a modified form of a coupler operating mechanism embodying the invention.

Figure 1:
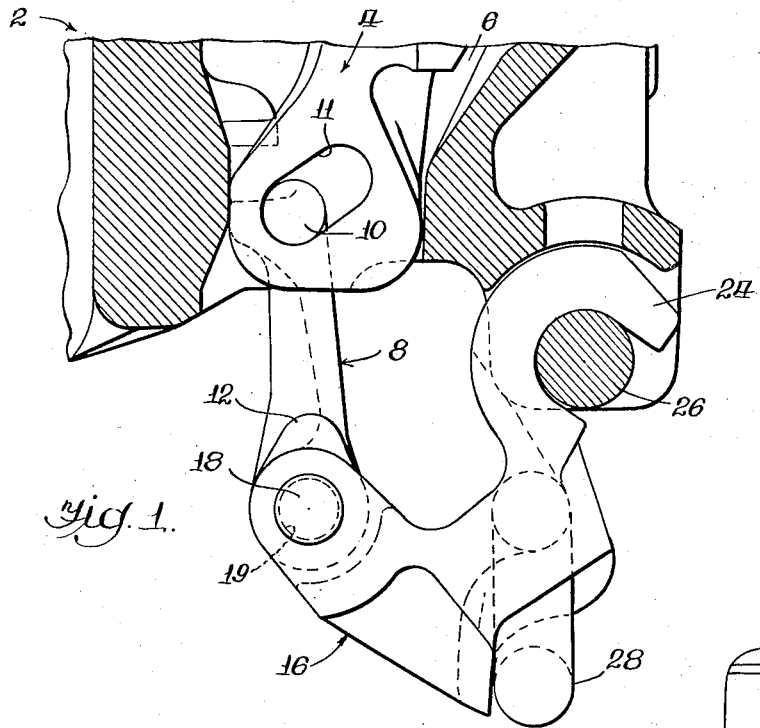
Figure 1 is a fragmentary side elevational view of a coupler operating mechanism embodying the invention, the coupler head being shown in vertical section.
Figure 2:
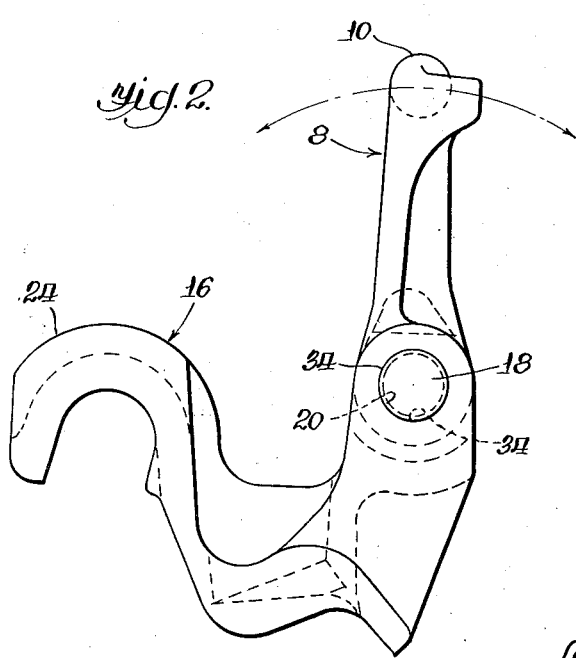
Figure 2 is a side elevational view of the rotor lever and toggle assembly utilized in the arrangement of Figure 1.

Describing the invention in detail and referring first to Figures 1 to 6 inclusive, the coupler, which is illustrated as a Standard E coupler, comprises a head fragmentarily indicated at 2 and provided with a conventional knuckle (not shown) pivoted thereto in the usual manner. The knuckle is locked by a conventional lock fragmentarily indicated at 4 which moves vertically within a lock cavity 6 of the head 2.

The lock 4 is actuated by a link or toggle member 8 having a trunnion 10 received within a slot 11 at the lower end of the lock 4. The lower end of the toggle 8 is received between spaced jaws 12 of a rotor lever member, generally designated 16, and is pivoted thereto by a rivet 18 passing through complementary aligned holes or openings 20 and 22 of the jaws 12 and toggle 8, respectively.

The rotor lever member 16 is provided with a hub 24 rotatably mounted on a trunnion 26 of the coupler head 2, and intermediate its ends the rotor lever member is connected to a hook portion 28 of a conventional operating rod, said hook portion passing through an eye 30 (Figure 3) of the rotor lever member 16.

Thus it will be understood by those skilled in the art that the lock 4 is actuated by the toggle 8 which is operatively connected to the rotor lever member 16. This member 16 is operated in the usual manner by the hook portion 28 of the conventional operating rod.

As best seen in Figures 4 to 6 inclusive, the rivet openings 20 are preferably cylindrical in form and are flared at their outer ends as at 32 to receive complementary countersunk heads 34 (Figures 2 and 3) of the rivet 18. At least one of the flared rivet hole segments 32 is provided with means for positively preventing rotation of the rivet 18 relative to the rotor lever member 16, said means comprising a tongue or lug 35 integrally formed on the related jaw 12 within the flared segment 32 of its rivet openings 20.

Figure 3:
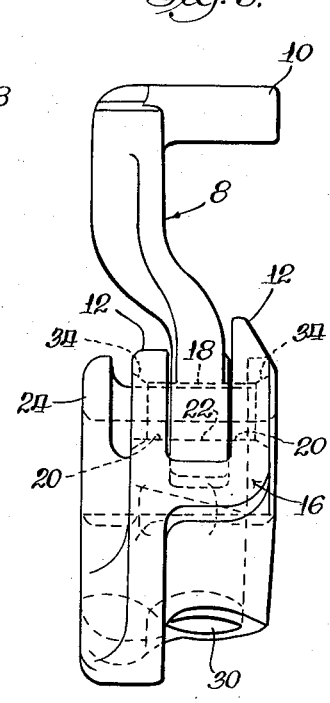
Figure 3 is a front elevational view of the assembly shown in Figure 2.

The tongue 35 merges at its inner or base end with the inner or cylindrical segment of the rivet hole 20, and said tongue tapers outwardly to a point at the outer end of the flared hole segment 32, as best seen in Figures 4 and 6. Thus it will be understood that as the rivet 18 is headed by any conventional means such as a rivet gun or hammer to form the before mentioned heads 34 which are complementary to the flared rivet hole segments 32, the head which is formed in the hole containing the tongue 35 is automatically formed with a groove complementary to said tongue and receiving the same. The tongue 35 and its complementary groove in the related rivet head 34 extend lengthwise of said tongue and groove axially of the rivet hole 20 as best seen in Figures 3, 5 and 6, so that the rivet 18 is positively restrained against rotational movement relative to the rotor lever member 16.

Referring again to Figure 1, it will be noted that when the coupler operating parts 4, 8 and 16 are static, with the lock 4 in locked position, the rivet 18 is positively restrained against accidental rotation due to vibration, and it has been found that this novel arrangement greatly reduces wear on the rivet and eliminates early failure thereof as heretofore described.

Referring now to Figure 7, wherein parts corresponding to those described in connection with Figures 1 to 6 are identified by corresponding numerals, it will be noted that the rotor lever 16 is a multipiece structure comprising a forward segment or member 50 pivotally connected by a rivet 18 to the toggle 8, as heretofore described in connection with Figures 1 to 6. The segment 50 is similarly connected by a rivet 18 to a rear segment or member 52 of the rotor lever 16, said rear segment being provided with the hub 24 which is rotatably journaled on the trunnion 26 of the coupler head 2, as described in connection with Figures 1 to 6.

Thus it will be seen that both rivets 18 shown in Figure 7 are interlocked with the rotor lever segment 50 against rotation relative thereto in the same manner as the single rivet 18 of the embodiment shown in Figures 1 to 6.

I claim:

In an operating mechanism for a machine including a pair of members having aligned openings, the combination of: a rivet comprising a circular head on one end thereof and a cylindrical shank of lesser diameter than said head extending from the head through said openings and operable to pivotally interconnect said members, said shank having at the end thereof remote from said head a portion, deformable upon the application of pressure thereagainst to form a second head of greater diameter than said shank, operable to prevent the accidental removal of said rivet axially from said openings; and a lug on one of said members projecting into the opening of said one member and being embeddable in said end portion of the rivet shank, when said portion is deformed by the application of pressure thereagainst, to prevent the rotation of the rivet relative to said one member.

References Cited in the file of this patent

UNITED STATES PATENTS

| | | |
|---|---|---|
| 811,965 | Smith | Feb. 6, 1906 |
| 1,335,673 | Elledge | Mar. 30, 1920 |
| 1,411,278 | Jarvis | Apr. 4, 1922 |
| 1,531,216 | Phelps | Mar. 24, 1925 |
| 1,769,705 | McGee | July 1, 1930 |
| 1,825,675 | Morse | Oct. 6, 1931 |
| 1,883,906 | Hasselquist | Oct. 25, 1932 |
| 2,083,422 | Bazeley | June 8, 1937 |
| 2,188,422 | Waner | Jan. 30, 1940 |
| 2,206,740 | Burke | July 2, 1940 |
| 2,393,912 | Kahler | Jan. 29, 1946 |
| 2,707,443 | Pope et al. | May 3, 1955 |

FOREIGN PATENTS

| | | |
|---|---|---|
| 154,821 | Great Britain | Dec. 9, 1920 |